Aug. 10, 1965

C. E. ATKINS 3,200,305

TOUCH RESPONSIVE CIRCUIT

Filed Sept. 7, 1962

INVENTOR.
CARL E. ATKINS

BY Eyre, Mann & Lucas

ATTORNEYS

United States Patent Office 3,200,305
Patented Aug. 10, 1965

3,200,305
TOUCH RESPONSIVE CIRCUIT
Carl E. Atkins, Great Notch, N.J., assignor to Tung-Sol Electric Inc., a corporation of Delaware
Filed Sept. 7, 1962, Ser. No. 222,045
9 Claims. (Cl. 317—146)

The present invention relates to touch control circuits and provides novel circuits of this type which have positive switching action, consume relatively little power, and utilize a minimum amount of circuit elements. The circuits are relay switching circuits which when properly contacted respond to body capacity to either energize or deenergize a relay. In these circuits, the coil of the relay is connected to the 60 cycle A.C. line in series with a ballast circuit and is shunted by a switching circuit including a diode and a 3-terminal semiconductor switching device, preferably a four zone PNPN germanium device such as the 2N1966. The diode is arranged to short the coil during the positive one-half cycle of the current drawn from the A.C. line so that the energization or deenergization of the relay can be controlled by selectively rendering the semiconductor device conducting or non-conducting during the negative one-half cycle of the current. Therefore, when the semiconductor device is made conductive the relay coil is shorted and when the semiconductor device is made non-conductive current flows through the coil energizing the relay.

The circuit then has two modes of operation, a standby mode, when the semiconductor is conducting and the relay coil is shorted, and an active mode, when the semiconductor is non-conducting and the relay is energized. During both modes of operation there is a substantial voltage drop across the ballast circuit. To minimize the consumption of power by the circuit, the ballast circuit is made highly capacitative and therefore is primarily non-consuming. In fact, the ballast circuit is almost completely capacitative, the voltage developed across it being more than 80° out of phase with the current drawn from the line. This is important in this type of circuit since it is in use, if only in the standby mode, continuously, and if its consumption of power is high, economics would negate its value.

To control the switching circuit, a bias supply, two glow tube oscillators, and two touch responsive circuits are supplied. The bias supply supplies voltage from the A.C. line to the switching terminal, the inner N zone, of the semiconductor device. The bias voltage lags the current drawn from the line through the ballast circuit so that, proper bias is supplied to the base of the four zone device at the desired portion of the negative half cycle of said drawn current.

In the standby mode, the output from the first of the oscillators is summed with the bias voltage and drives the base of the semi-conductor sufficiently negative to keep the semiconductor device conducting. To switch the circuit to its active mode, the first touch responsive element is contacted to suppress the application of pulses from the first oscillator to the base of the semiconductor device allowing the semiconductor to become non-conductive. Once the circuit is in its active mode and the relay energized, contacts of the relay coupled to the oscillator disable the first oscillator to prevent the semiconductor from returning to its conducting state when touch is removed from the touch responsive element. To return the circuit to its standby mode, the second touch responsive element, which is associated with the second of the oscillators, must be touched. When it is touched it increases the magnitude of the negative pulses produced by the second oscillator so that the base of the semiconductor device is driven sufficiently negative to place the circuit back in its standby mode of operation.

With the circuit in its standby mode the first oscillator is again enabled by the deenergization of the relay and, after touch is removed from the second touch responsive element, will drive the base sufficiently negative to keep the semiconductor device conducting.

If a single oscillator is used, which is disabled when one touch responsive element is touched and enabled when a second touch responsive element is contacted, it is necessary to assure operation, to provide two levels of bias at the base of the semiconductor. The use of two oscillators that cooperate with each other as described above eliminates the necessity for the double level of bias thus simplying the circuit and reducing the number of circuit elements.

For a better understanding of the invention and of illustrated embodiments of the same reference may be had to the accompanying drawing in which.

Figure 1:
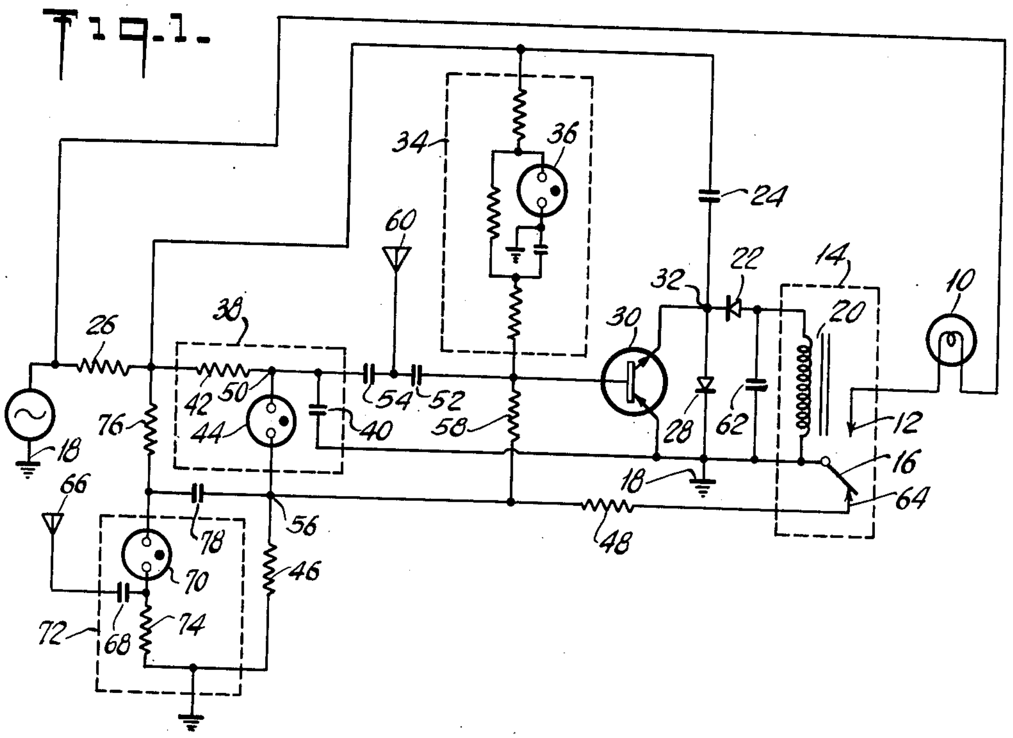
FIG. 1 is an electrical schematic of one embodiment of the invention.

In the embodiment shown in FIG. 1, the load 10 is connected to a normally open terminal 12 of a relay 14. The armature 16 for this relay is connected to ground 18 as is one terminal of the relay coil 20. The other terminal of the relay coil is coupled through a diode 22, capacitor 24, and resistor 26 to one side of the 60 cycle 115 v. A.C. line. The other side of the line is connected to ground 18 to complete the circuit between the 60 cycle line and the coil 20 of the relay.

To control the excitation of the coil by the 60 cycle line a second diode 28 and a p-n-p-n germanium semiconductor device 30 are shunted across the first diode 22 and the coil 20 of the relay. The shunting diode 28, conducts during the positive one-half cycle of the current drawn from the line to short the coil during that one-half cycle. The semiconductor 30 can be selectively rendered conducting or non-conducting during the negative one-half cycle to control the energizing and de-energizing of the relay.

A phase shifting network 34 couples the base of the semiconductor device to the 60 cycle line to A.C. bias the base with respect to the collector. The phase shifting network lags the bias voltage supplied on the base so that the proper positive bias occurs during the desired part of the negative one-half cycle of the current drawn through capacitor 24. A neon tube 36 in the bias supply circuit performs a voltage regulating function to keep the bias at the base within required limits.

To drive the base sufficiently negative during the negative one-half cycle to cause conduction of the semiconductor device 30, an oscillator 38 is provided. In this oscillator, a capacitor 40 is charged by current passing through a resistor 42. When the charge on the capacitor exceeds the breakdown potential of a glow tube 44, coupled in series with two tandem resistors 46 and 48 across the capacitor, the glow tube conducts discharging the capacitor 40 until the voltage across the capacitor becomes insufficient to maintain conduction in the glow tube. When the glow tube 44 extinguishes, the capacitor 40 again starts charging until the voltage across it again reaches the glow tube 44 breakdown potential.

Pulses produced by this alternate charging and discharging of capacitor 40 are taken off the oscillator at two points, one on either side of the glow tube 44. The first point 50 is connected to the base through two capacitors 52 and 54 and the second point 56 is connected to the base through resistor 58. Since these points 50 and 56 are on opposite sides of the glow tube, the produced pulses are of opposite polarity and therefore subtract from each other at the base. Resistor 58 is so selected that the pulses from point 50 are dominant in the subtraction.

To energize the relay 14, a first touch responsive element 60 is connected to the junction of capacitors 52 and 54. When this touch responsive element is contacted, the body capacity of the individual touching the element provides a path to ground. This reduces the magnitude of the negative pulses supplied from point 50 to the base. With a decrease in the negative pulses, the semiconductor 30 is rendered non-conducting, permitting current to flow through the coil of the relay during the negative one-half cycle of the line voltage.

While current is passing through the coil 20 on the negative half cycle, a capacitor 62 coupled across the coil, charges. During the positive half cycle when point 32 is kept at ground potential by diode 28, diode 22 prevents the passage of current from the capacitor 62 to ground through the diode 28. This capacitor therefore discharges through the coil to keep the relay energized until the next half cycle.

With energization of the relay, the armature 16 of the relay moves from normally closed contact 64 to the normally open contact 12 completing the circuit between the load 10 and the 60 cycle line. Energization of the relay also breaks the ground connection to resistor 48 removing it from the oscillating circuit 38. With resistor 48 removed from the oscillating circuit the resistance in series with the neon tube 44 is increased. The increase in the resistance in series with the glow tube 44, decreases the magnitude of the pulses at point 50 sufficiently to prevent conduction of the semiconductor device after touch is removed from the touch responsive element 60.

To deenergize the relay another touch responsive element 66 is provided. This touch responsive element 66 is connected through a capacitor 68 to a glow tube 70 in a normally dormant oscillator 72. As long as element 66 is not touched tube 70 will not fire because a large resistor 74 connecting the glow tube to ground prevents the tube from breaking down. Therefore current drawn from the line through resistor 76 continually charges a capacitor 78 which is connected to the base of the semiconductor 30 by resistor 58. However, when element 66 is contacted the body capacity of the individual provides a path for capacitor 68 to ground. This shunts the resistor 74 with the capacitor 68 decreasing the impedance of the path to ground through the tube and thus permitting the tube 70 to fire and discharge capacitor 78.

With firing of glow tube 70 capacitor 68 starts charging and continues to charge until the potential across it cuts off the glow tube 70. When the glow tube cuts off capacitor 68 starts discharging through resistor 74. This continues until the voltage across the tube again exceeds the breakdown potential, the tube conducts, and capacitor 68 again charges. With each firing of the glow tube 70, the capacitor 78, discharges sharply dropping the potential of the base of the semiconductor 30. When this occurs during the negative half cycle of current through capacitor 24 the semiconductor conducts. With conduction, the relay is deenergized returning the arm 16 to the normally closed contact 64. This returns resistor 48 to ground so that when touch is removed from touch responsive element 66, and oscillator 72 again becomes dormant, the semiconductor is kept conducting by pulses from oscillator 38.

What has been described has been the use of the circuit for bistable operation. The circuit is easily adapted to monostable operation by the connection of the normally closed contact 64 to ground. This keeps the ground 18 on resistor 48 no matter what the position of the armature 16 is in. Therefore, after touch responsive element 60 is contacted, and the relay thereby energized, resistor 48 remains in the circuit of oscillator 38, and when contact is removed from the touch responsive element 60 the output of oscillator 38 again starts the semiconductor device conducting.

Figure 2:
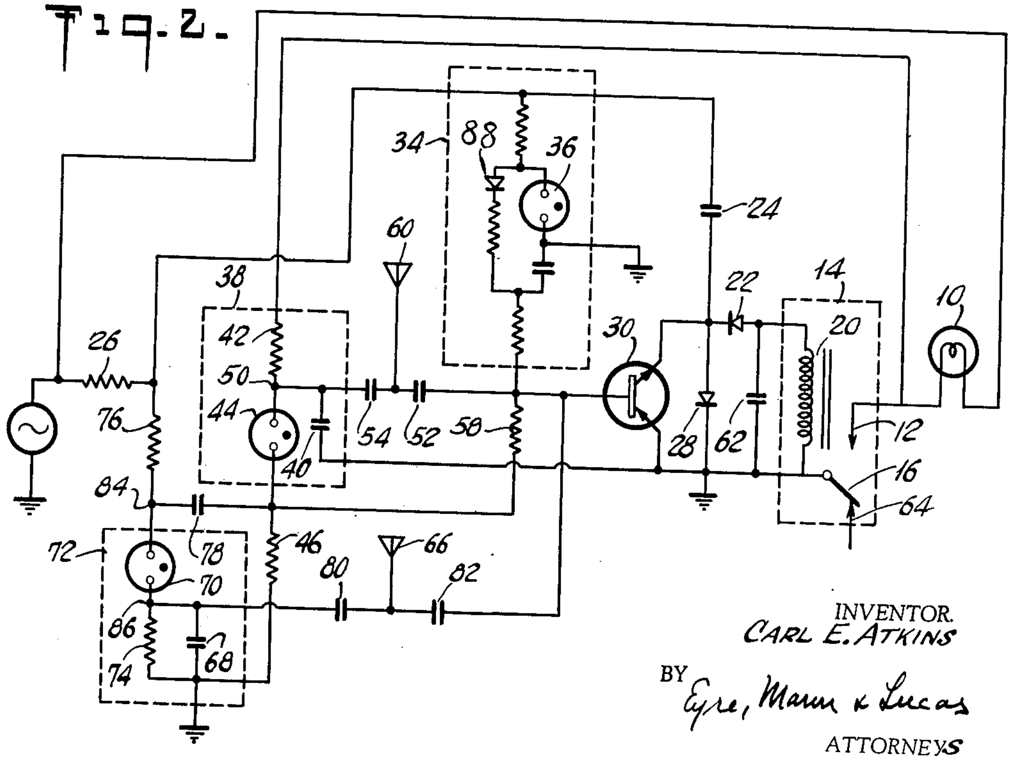
FIG. 2 is an electrical schematic of a second embodiment of the invention.

The embodiment shown in FIG. 2 differs from that of FIG. 1 in a number of ways. Capacitor 68 is permanently shunted across resistor 74 making the operation of oscillator 72 independent of touch. Resistor 42 is connected to the normally open terminal 12 of the relay instead of being connected to resistor 26, and resistor 48 is eliminated so that oscillator 38 is completely disabled when the relay is energized. Capacitors 80 and 82 are added between the oscillator 72 and the base of the semiconductor device to provide a path for positive pulses from oscillator 72 to the base of the semiconductor. Touch responsive element 66 is connected to a point common to the new capacitors 80 and 82 to suppress the magnitude of the positive pulses supplied to the base of the semiconductor device from the oscillator 72; and diode 88 is added to the bias supply 34 to prevent radio interference caused by premature firing of the four layer semiconductor 30 by keeping the bias supplied by the bias supply 34 positive at all times. The oscillator 72 of the embodiment in FIGURE 2 is described and claimed in copending application Ser. No. 388,644 filed August 10, 1964.

With this arrangement, when touch responsive element 60 is contacted the semiconductor device 30 is rendered non-conductive. Current then flows through the coil 20 of the relay bringing the armature 16 of the relay in contact with the normally open terminal 12 of the relay. This shorts out the path from the oscillator 38 to the power supply disabling oscillator 38 completely. At the same time the current through the load 10 is increased considerably since it is now connected directly across the line instead of in series with capacitor 40 and resistor 42.

Since the oscillator 38 is completely disabled when touch is removed from the touch responsive element 60 the semiconductor device 30 remains non-conducting and the relay 14 remains energized. The second oscillator 72, because capacitor 68 is permanently connected across resistor 72, continuously oscillates sending pulses from two points 84 and 86 to the base of the semiconductor device 30. Point 84 supplies negative pulses during the negative one-half cycle of the current drawn through capacitor 24 and point 86 supplies positive pulses during the negative half cycle of the current drawn from the line through capacitor 24. The pulses from points 84 and 86 are summed at the base of the semiconductor device 30. The resultant pulses produced by this summation are not sufficiently negative to cause the semiconductor 30 to conduct. Therefore when the relay deenergizes and the first oscillator 38 is disabled, the pulses from the second oscillator 72 will not restore the semiconductor 30 to its conducting state. However, when touch responsive element 66 is contacted it suppresses the application of the positive going pulses from point 86 on the base of the semiconductor upsetting the balance between the negative pulses from point 84 and the positive pulses from point 86 and causing the summation at the base to be sufficiently negative to start conduction in the semiconductor device 30. With conduction in the semiconductor device 30, the relay 14 is deenergized and the armature 16 returns to the normally closed terminal 64 thus removing ground from the normally open terminal 12, enabling the first oscillator 38. Therefore, when touch is removed from the touch responsive element 66, the semiconductor device is kept conducting by the pulses from the first oscillator 38.

Though the exact circuitry for controlling the supply of pulses to the base of the semiconductor illustrated in FIG. 1 differs from the embodiment of FIG. 2, the circuits are quite similar. First of all neither requires a D.C. power supply. By proper phasing the excitation for various parts of the circuits the necessity for D.C. power supplies is eliminated. Also both circuits use a capacitative ballast circuit in series with the coil to minimize power consumption. The elimination of the power supplies and the use of this capacitative ballast has a marked effect on the power consumption of the device. In fact, the device requires only 35 milliwatts while in comparison an electric clock requires 3 watts. As pointed out previously, this is quite important in this type of circuit since, in many applications its use is continuous, and any excessive consumption of power would negate its value.

Although the exact manner of controlling the excitation to the semiconductor device may differ from one embodiment to the other, both use two oscillators which cooperate to provide the necessary control over the semiconductor device. As pointed out previously, this insures more positive switching action and eliminates the need for two levels of bias at the base of the semiconductor.

It will be understood that this is intended to cover all changes and modifications of the described form of the structure herein chosen for the purpose of illustration which do not constitute departures from the spirit and scope of the invention.

The following is claimed:

1. A touch responsive circuit for controlling the supply of excitation from an A.C. line to a load comprising:

(a) a relay which controls the supply of current from the line to the load;

(b) a capacitative ballast circuit in series between the A.C. line and the coil of the relay to supply the relay with excitation;

(c) a rectifying means coupled across the coil to shunt current past the coil during the half cycles of one polarity of the supplied excitation;

(d) a semiconductive switching device with a base, an emitter, and a collector terminal that is coupled across the coil through its emitter and collector terminals;

(e) a bias supply coupled to the base of the semiconductor keeping the semiconductor non-conducting and thereby permitting current to flow through the coil on the half cycles of opposite polarity of the supplied excitation;

(f) pulse means coupled to the base of the semiconductor switching device supplying pulses to the base of the semiconductor device to trigger the device and shunt current past the coil during the half cycles of opposite polarity; and (g) touch responsive means coupled to the pulse means for controlling the supply of pulses to the base of the semiconductor device whereby the semiconductor device may be either rendered conducting or non-conducting by selectively touching the touch responsive means.

2. The circuit of claim 1 wherein said bias supply supplies an A.C. bias which is at the same frequency as that of the excitation supplied to the coil and phase-shifted therefrom to bias the semiconductor non-conducting during the half cycles of said opposite polarity.

3. The circuit of claim 2 where (a) said semiconductor switching device is a four layer PNPN germanium semiconductor;

(b) the half cycles of said opposite polarity are the negative half cycles; and (c) the A.C. bias is lagged to obtain the proper bias levels at the base during the negative half cycles.

4. The circuit of claim 1 wherein (a) said pulse means are two oscillators whose output pulses are fed to the base of the semiconductor device, said pulses being supplied by the oscillators at two levels the first level while the relay is deenergized being sufficient to keep the semiconductor conducting, the second level supplied when the relay is energized being insufficient to cause the semiconductor device to conduct; and (b) said touch responsive means for controlling the level of pulses includes two touch responsive elements, one coupled to said first oscillator to suppress the magnitude of the pulses supplied to the semiconductor so that while the relay is deenergized the semiconductive switching device may be rendered non-conducting thereby energizing the relay, and the second touch responsive element being coupled to said second oscillator and increasing the magnitude of pulses supplied to the semiconductor so that when the relay is energized the pulses from the second oscillator will drive the semiconductor into its conducting state and cause deenergization of the relay.

5. The circuit of claim 1 wherein said bias supply supplies one-half wave rectified A.C. bias which is at the same frequency as that of the excitation supplied to the coil and phase-shifted therefrom to bias the semiconductor non-conducting during the half cycles of said opposite polarities.

6. The circuit of claim 5 wherein (a) said semiconductor switching device is a four layer PNPN germanium semiconductor;

(b) the half cycles of said opposite polarity are the negative half cycles; and (c) the A.C. bias is lagged to attain proper bias levels at the base during the negative half cycles.

7. In a touch responsive circuit of the type having a switching circuit which by energizing and deenergizing a relay positions the armature of the relay in a first position when triggered with pulses exceeding a certain minimum magnitude and positions the armature of the relay in a second position when the pulses are below that minimum, the improvement comprising:

(a) a first oscillator coupled to the switching circuit to supply it with triggering pulses and to the armature and the contact of the relay to make the magnitude of the pulses supplied to the switching circuit dependent on the position of the armature;

(b) a second oscillator coupled to said switching circuit to supply it with pulses, so that the pulses supplied to the switching circuit by the first and second oscillators are larger than the minimum magnitude when the armature is in the first position and smaller than the minimum magnitude when the armature is in the second position;

(c) a first touch responsive means coupled to the first oscillator which when touched while the armature is in the first position suppresses the application of pulses of the first oscillator to the switching circuit so the magnitude of the pulses supplied to the switching circuit fall below the minimum level and the armature of the relay moves to its second position; and (d) a second touch responsive means coupled to the second oscillator which when touched while the armature is in its second position increases the magnitude of the pulses out of said second oscillator so the magnitude of the pulses to the switching circuit exceeds the minimum magnitude and the armature of the relay moves to its first position.

8. The circuit of claim 7 wherein (a) said first oscillator is a low frequency source of two sets of pulses of opposite polarity that are summed to provide resultant pulses whose magnitude exceeds the minimum magnitude;

(b) said first touch responsive means is coupled to the oscillator in the path of the pulses that are dominant in the summation to suppress them so that the magnitude of the pulses from the first oscillator fall below the minimum level;

(c) said second oscillator is a low frequency source of two sets of pulses of opposite polarity that are summed to provide resultant pulses whose magnitude is less than the minimum magnitude; and (d) said second touch responsive means is coupled in the path of the second oscillator which supplies pulses of polarity opposite to that of the dominant pulses supplied by the first oscillator to suppress pulses in said path of the second oscillator and thereby cause the resultant pulses from the second oscillator to exceed the minimum level.

9. The circuit of claim 7 wherein (a) said first oscillator is a low frequency source of pulses of opposite polarity that are summed to provide resultant pulses whose magnitude exceeds the minimum magnitude;

(b) said first touch responsive means is coupled to the first oscillator in the path of the pulses dominant in the summation to suppress them and thereby drive the magnitude of the pulses produced by the summation below the minimum level;

(c) said second oscillator is normally dormant; and (d) said second touch responsive means when touched activates the second oscillator to produce pulses that when summed with the output of the first oscillator while the armature is in the second position supplied pulses to the base of the switching circuit which exceed the minimum magnitude.

References Cited by the Examiner

UNITED STATES PATENTS

| | | | |
|---|---|---|---|
| 2,704,339 | 3/55 | Wescott et al. | 317—149 X |
| 2,743,433 | 4/56 | Parmet | 340—258 |
| 2,992,420 | 7/61 | Riker. | |
| 3,025,434 | 3/62 | Atkins et al. | 317—149 X |
| 3,081,594 | 3/63 | Atkins et al. | 317—149 X |
| 3,109,893 | 11/63 | Burns. | |
| 3,111,608 | 11/63 | Boenning et al. | 317—148.5 X |

SAMUEL BERNSTEIN, *Primary Examiner.*